(12) United States Patent
Das et al.

(10) Patent No.: US 9,813,178 B2
(45) Date of Patent: Nov. 7, 2017

(54) SYSTEMS AND METHODS FOR SMALL CELL UPLINK INTERFERENCE CANCELLATION USING COOPERATION BETWEEN SMALL CELLS

(71) Applicant: QUALCOMM Incorporated, San Diego, CA (US)

(72) Inventors: Soumya Das, San Diego, CA (US); Bongyong Song, San Diego, CA (US); Samir Salib Soliman, Poway, CA (US); Kaushik Chakraborty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 507 days.

(21) Appl. No.: 13/685,469

(22) Filed: Nov. 26, 2012

(65) Prior Publication Data

US 2014/0148179 A1 May 29, 2014

(51) Int. Cl.
*H04W 72/00* (2009.01)
*H04J 11/00* (2006.01)
*H04B 1/7107* (2011.01)

(52) U.S. Cl.
CPC .......... *H04J 11/004* (2013.01); *H04B 1/7107* (2013.01); *H04B 2201/698* (2013.01); *H04B 2201/70702* (2013.01)

(58) Field of Classification Search
CPC ............................ H04J 11/004; H04B 1/7107
USPC ...................... 455/452.1, 443, 453
See application file for complete search history.

(56) References Cited

U.S. PATENT DOCUMENTS

| | | | |
|---|---|---|---|
| 8,160,013 B2 | 4/2012 | Kim et al. | |
| 2009/0196162 A1 | 8/2009 | Sambhwani et al. | |
| 2010/0008294 A1 | 1/2010 | Palanki et al. | |
| 2010/0087221 A1* | 4/2010 | Srinivasan et al. | 455/522 |

(Continued)

FOREIGN PATENT DOCUMENTS

WO 2012041835 A1 4/2012

OTHER PUBLICATIONS

3GPP: "3rd Generation Partnership Project; Technical Specification Group Radio Access Network; UTRAN architecture for 3G Home Node B (HNB); Stage 2 (Release 11)", 3GPP Standard; 3GPP TS 25.467, 3rd Generation Partnership Project (3GPP), Mobile Competence Centre ; 650, Route Des Lucioles ; F-06921 Sophia-Antipolis Cedex ; France, vol. RAN WG3, No. V11.0.0, Sep. 21, 2012 (Sep. 21, 2012), pp. 1-62, XP050649582.

(Continued)

*Primary Examiner* — Chuck Huynh
(74) *Attorney, Agent, or Firm* — Bala Ramasamy

(57) ABSTRACT

A method of managing uplink interference at a base station includes: detecting uplink interference caused by one or more inter-cell user equipments to an uplink channel of a base station, the one or more inter-cell user equipments associated with a neighboring base station; receiving, at the base station, assistance information from the neighboring base station, the assistance information comprising a parameter list of ongoing transmissions by the one or more user equipments associated with the neighboring base station; and performing uplink interference cancellation, at the base station, on at least a portion of a received signal based on the assistance information to generate a resulting signal.

38 Claims, 10 Drawing Sheets

(56) References Cited

U.S. PATENT DOCUMENTS

| | | | |
|---|---|---|---|
| 2010/0158161 A1* | 6/2010 | Sambhwani | H03M 13/2957 375/341 |
| 2010/0203891 A1 | 8/2010 | Nagaraja et al. | |
| 2010/0238888 A1 | 9/2010 | Sampath et al. | |
| 2010/0329398 A1* | 12/2010 | Rao | H04B 1/71075 375/346 |
| 2011/0124289 A1 | 5/2011 | Balachandran et al. | |
| 2011/0141971 A1 | 6/2011 | Zhang et al. | |
| 2011/0182252 A1* | 7/2011 | Liu | H04W 74/008 370/329 |
| 2011/0312327 A1 | 12/2011 | Kubota | |
| 2011/0312355 A1 | 12/2011 | Cheng et al. | |
| 2012/0071153 A1 | 3/2012 | Balachandran et al. | |
| 2012/0135743 A1 | 5/2012 | Ebiko et al. | |
| 2012/0250565 A1* | 10/2012 | Zhang | H04J 11/0053 370/252 |

OTHER PUBLICATIONS

International Search Report and Written Opinion—PCT/US2013/071462—ISA/EPO—Apr. 16, 2014.

QUALCOMM Europe: "Inter-cell Interference Cancellation in CELL_DCH and CELL_FACH", 3GPP Draft; R1-081357, 3rd Generation Partnership Project (3GPP), Mobile Competence Centre ; 650, Route Des Lucioles ; F-06921 Sophia-Antipolis Cedex ; France, vol. RAN WG1, no. Shenzhen, China; Mar. 26, 2008, Mar. 26, 2008 (Mar. 26, 2008), pp. 1-6, XP050109781, [retrieved on Mar. 26, 2008].

Sambhwani S., et al., "Uplink Interface Cancellation in HSPA: Principles and Practice", May 30, 2012 (May 30, 2012), pp. 1-28, XP055112132, Retrieved from the Internet: URL: http://de.scribd.com/doc/95308378/Uplink-Interference-Cancellation-in-Hspa-Principles-and-Practice [retrieved on Apr. 4, 2014] abstract pp. 1,7-8,27.

Teliasonera: "Clarification on the ANR when UTRAN is shared", 3GPP Draft; R3-122691 ANR UTRAN CR 36_300, 3rd Generation Partnership Project (3GPP), Mobile Competence Centre; 650, Route Des Lucioles; F-06921 Sophia-Antipolis Cedex; France vol. RAN WG3, No. New Orleans, USA; Nov. 12, 2012-Nov. 16, 2012 Nov. 2, 2012 (Nov. 2, 2012), pp. 1-2, XP050670479, Retrieved from the Internet: URL: http://www.3gpp.org/ftp/tsg_ran/WG3_lu/TSGR3_78/Docs/ [retrieved on Nov. 2, 2012] * chapter 22.3.4 *.

* cited by examiner

SYSTEMS AND METHODS FOR SMALL CELL UPLINK INTERFERENCE CANCELLATION USING COOPERATION BETWEEN SMALL CELLS

BACKGROUND

1. Field

The disclosure relates generally to wireless systems and methods, and, in particular, to systems and methods for managing uplink inter-cell interference.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long-term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more access points via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

To supplement conventional access points, additional restricted access points can be deployed to provide more robust wireless coverage to mobile devices. For example, wireless relay stations and low power access points (e.g., which can be commonly referred to as Home Node Bs or Home eNBs, collectively referred to as H(e)NBs, femto access points, femtocells, picocells, microcells, etc.) can be deployed for incremental capacity growth, richer user experience, in-building or other specific geographic coverage, and/or the like. In some configurations, such low power access points can be connected to the Internet via broadband connection (e.g., digital subscriber line (DSL) router, cable or other modem, etc.), which can provide the back haul link to the mobile operator's network. Thus, for example, the low power access points can be deployed in user homes to provide mobile network access to one or more devices via the broadband connection.

Such low power access points (small cell devices), such as femtocells, picocells, etc., employ a multiple-access uplink (UL) channel (e.g., WCDMA, 4G-LTE, etc.), which is prone to interference. Deployment of such low power access points is unplanned in many cases, and thus the access points and/or mobile devices communicating therewith can cause interference to other low power access points, macrocell access points, or other devices in the vicinity. In some cases, some low power access points can operate in a restricted association allowing communications only from certain devices (e.g., devices belonging to a list of authorized devices or users). In such cases, devices in-range but not allowed to communicate with the low power access point can interfere therewith when communicating to a different access point. The interference can lead to a poor user experience.

SUMMARY

A method of managing uplink interference at a base station may include, but is not limited to, any one or combination of: detecting uplink interference caused by one or more inter-cell user equipments to an uplink channel of a base station, the one or more inter-cell user equipments associated with a neighboring base station; receiving, at the base station, assistance information from the neighboring base station, the assistance information comprising a parameter list of ongoing transmissions by the one or more user equipments associated with the neighboring base station; and performing uplink interference cancellation, at the base station, on at least a portion of a received signal based on the assistance information to generate a resulting signal.

In various embodiments, the method further includes transmitting a request for the assistance information to the neighboring base station. The assistance information is received in response to the request.

A method of managing uplink interference at a base station may include, but is not limited to, any one or combination of: receiving, at the base station, assistance information from a neighboring base station, the assistance information comprising a parameter list of ongoing transmissions by one or more inter-cell user equipments associated with the neighboring base station, the ongoing transmissions of the one or more inter-cell user equipments causing uplink interference to an uplink channel of the base station; and performing uplink interference cancellation, at the base station, on at least a portion of a received signal based on the assistance information to generate a resulting signal.

In various embodiments, the method further includes detecting the uplink interference caused by the one or more inter-cell user equipments. The uplink interference cancellation is performed in response to detecting the uplink interference.

In various embodiments, the method further includes transmitting a request for the assistance information to the neighboring base station. The assistance information is received in response to the request.

In various embodiments, the method further includes transmitting a request for the assistance information to the neighboring base station, wherein the assistance information is received in response to the request; and detecting the uplink interference. The uplink interference cancellation is performed in response to detecting the uplink interference.

In various embodiments, the method further includes: detecting the uplink interference caused by the one or more inter-cell user equipments; and transmitting, in response to detecting the uplink interference, a request for the assistance information to the neighboring base station. The assistance information is received in response to the request.

In various embodiments, the at least a portion of the received signal is cancelled via successive interference cancellation.

In various embodiments, the at least a portion of the received signal is cancelled via iterative parallel interference cancellation.

In various embodiments, the at least a portion of the received signal is cancelled via iterative group interference cancellation.

In various embodiments, the assistance information is received in response to one of the inter-cell user equipments determining that said inter-cell equipment is causing uplink interference to the uplink channel of the base station.

In various embodiments, the assistance information is received directly from the neighboring base station.

In some embodiments, the assistance information is received directly from the neighboring base station via Wi-Fi Direct.

In some embodiments, the assistance information is received directly from the neighboring base station via Long-Term Evolution White Space (LTE-WS).

In some embodiments, the assistance information is received directly from the neighboring base station via Long-Term Evolution device-to-device (LTE-D2D).

In some embodiments, the assistance information is received directly from the neighboring base station via Wi-Fi.

In some embodiments, the assistance information is received directly from the neighboring base station via a power line connection (PLC).

In some embodiments, the assistance information is received directly from the neighboring base station via a backhaul connection.

In various embodiments, the assistance information is received from the neighboring base station via a user equipment associated with the neighboring base station.

In some embodiments, the assistance information is received from the neighboring base station via the user equipment associated with the neighboring base station via a wireless wide area network (WWAN) interface.

In some embodiments, the assistance information is received from the neighboring base station via the user equipment associated with the neighboring base station via an out-of-band (OOB) link.

In various embodiments, the base station comprises a small cell device.

In some embodiments, the small cell device comprises a femtocell.

In various embodiments, the base station comprises a macro cell device.

In various embodiments, the parameter list of the assistance information includes one or more of scrambling code type and scrambling code number.

In various embodiments, the parameter list of the assistance information includes one or more of spreading factor and orthogonal variable spreading factor (OVSF) code.

In various embodiments, the parameter list of the assistance information includes transmission time interval (TTI).

In various embodiments, the parameter list of the assistance information includes channel-coding type.

In various embodiments, the parameter list of the assistance information includes a rate matching attribute.

In various embodiments, the parameter list of the assistance information includes cyclic redundancy check (CRC).

In various embodiments, the parameter list of the assistance information includes UL DPCCH slot format including one or more of number of feedback indicator (FBI) bits, number of transmit power control (TPC) bits, number of transport format combination indicator bits (TFCI) bits.

In various embodiments, the parameter list of the assistance information includes one or more of transport format combination set (TFCS) and transport format set (TFS) for uplink.

In various embodiments, the parameter list of the assistance information includes puncturing limit.

In various embodiments, the parameter list of the assistance information includes one or more gain factors.

In various embodiments, the parameter list of the assistance information includes one or more of dedicated packet channel (DPCH) frame offset and chip offset parameters.

In various embodiments, the performing uplink interference cancellation includes: decoding, from the received signal, a bit stream from the user equipment associated with the neighboring base station; and providing the decoded bit stream to the neighboring base station.

In various embodiments, the method further includes determining a current resource utilization for the base station; and allowing access to an unauthorized user equipment when the current resource capacity is below predetermined threshold.

In some embodiments, decoding priority is given to an authorized user equipment over the unauthorized user equipment.

A method, performed by a user equipment, for managing uplink interference may include, but is not limited to, any one or combination of: detecting, by the user equipment, uplink interference caused by the user equipment to an uplink channel of a victim base station; and identifying the victim base station to a serving base station with which the user equipment is associated.

In various embodiments, assistance information is provided to the victim base station to allow the victim base station to perform interference cancellation.

A method of managing uplink interference at a base station may include, but is not limited to, any one or combination of: detecting uplink interference caused by one or more inter-cell user equipments to an uplink channel of a base station, the one or more inter-cell user equipments associated with a neighboring base station; generating minimum mean square error (MMSE) estimates of data symbols of a transmission of the one or more inter-cell user equipments, wherein the MMSE estimates are derived from a soft output of a channel decoder of the base station; and reconstructing a waveform based on the MMSE estimates.

A base station for managing uplink interference may include, but is not limited to, any one or combination of: a transceiver configured to receive assistance information from a neighboring base station, the assistance information comprising a parameter list of ongoing transmissions by one or more user equipments associated with the neighboring base station; and a processor configured to perform uplink interference cancellation on at least a portion of a received signal based on the assistance information to generate a resulting signal.

An apparatus for managing uplink interference at a base station may include, but is not limited to, any one or combination of: means for detecting uplink interference caused by one or more inter-cell user equipments to an uplink channel of a base station, the one or more inter-cell user equipments associated with a neighboring base station; means for receiving, at the base station, assistance information from the neighboring base station, the assistance information comprising a parameter list of ongoing transmissions by the one or more user equipments associated with the neighboring base station; and means for performing uplink interference cancellation, at the base station, on at least a portion of a received signal based on the assistance information to generate a resulting signal.

In various embodiments, the apparatus may further include means for transmitting a request for the assistance information to the neighboring base station. The assistance information is received in response to the request.

An apparatus for managing uplink interference at a base station may include a processor that may be configured for, but is not limited to, any one or combination of: detecting uplink interference caused by one or more inter-cell user equipments to an uplink channel of a base station, the one or more inter-cell user equipments associated with a neighboring base station; receiving, at the base station, assistance information from the neighboring base station, the assistance information comprising a parameter list of ongoing transmissions by the one or more user equipments associated with the neighboring base station; and performing uplink interference cancellation, at the base station, on at least a portion of a received signal based on the assistance information to generate a resulting signal.

In various embodiments, the processor is further configured for transmitting a request for the assistance information to the neighboring base station. The assistance information is received in response to the request.

A computer program product for managing uplink interference at a base station may include a computer-readable storage medium including code for, but is not limited to, any one or combination of: detecting uplink interference caused by one or more inter-cell user equipments to an uplink channel of a base station, the one or more inter-cell user equipments associated with a neighboring base station; receiving, at the base station, assistance information from the neighboring base station, the assistance information comprising a parameter list of ongoing transmissions by the one or more user equipments associated with the neighboring base station; and performing uplink interference cancellation, at the base station, on at least a portion of a received signal based on the assistance information to generate a resulting signal.

In various embodiments, the computer-readable storage medium further including code for: transmitting a request for the assistance information to the neighboring base station. The assistance information is received in response to the request.

DETAILED DESCRIPTION

Interference at a base station receiver antenna input comprises three components: (a) intra-cell interference representing sum of WCDMA uplink waveforms of all femtocell users; (b) inter-cell interference representing sum of WCDMA waveforms of all user equipments who do not communicate with the base station (e.g., user equipments associated with other base stations); and (c) thermal noise.

Various embodiments relate to cancelling uplink interference caused by inter-cell devices (user equipments) via assistance from neighboring base stations. In particular embodiments, a base station that is small cell device (e.g., femtocell, picocell, etc.) is configured to cancel uplink interference, which is caused by inter-cell UEs (UEs associated with neighboring base stations, such as femtocells, macrocells, etc.), using assistance information from the neighboring base stations. Accordingly, the assistance information may be used to decode a transmission of the interfering inter-cell UE(s) from a received waveform (signal) to cancel the interfering UE transmission.

In the description herein, a node that provides coverage over a relatively large area (e.g., a region spanning a neighborhood or group of neighborhoods, a town or a section of a city of town, etc.) may be referred to as a macro node while a node that provides coverage over a relatively small area (e.g., a residence, office, building, etc.) may be referred to as a femto node. It should be appreciated that the teachings herein may be applicable to nodes associated with other types of coverage areas. For example, a pico node may provide coverage over an area that is smaller than a macro area and larger than a femto area (e.g., coverage within a commercial building). In various applications, other terminology may be used to reference a macro node, a femto node, or other access point-type nodes. For example, a macro node may be configured or referred to as an access node, base station, access point, Node B, eNode B, macro cell, and so on. In addition, a femto node may be configured or referred to as a Home Node B, Home eNode B, access point base station, femto cell, and so on. In some implementations, a node may be associated with (e.g., divided into) one or more cells or sectors. A cell or sector associated with a macro node, a femto node, or a pico node may be referred to as a macro cell, a femto cell, or a pico cell, respectively. For instance, small cells may refer to femto cells, pico cells, etc. A simplified example of how femto nodes may be deployed in a network will now be described with reference to FIGS. 1 and 2.

Figure 1:
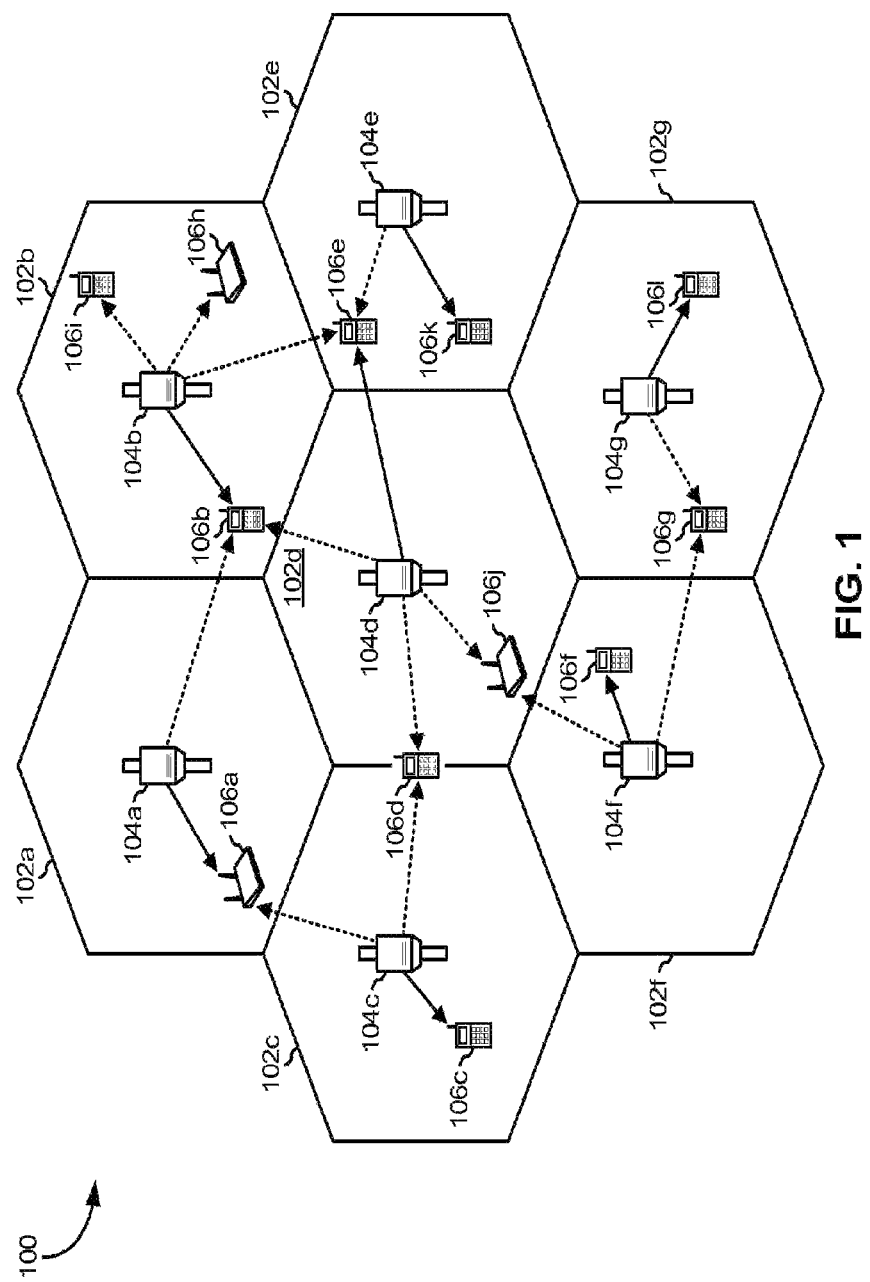
FIG. 1 is a wireless communication system according to various embodiments of the disclosure.

FIG. 1 illustrates an exemplary wireless communication system 100 configured to support a number of users, in which various disclosed embodiments and aspects may be implemented. As shown in FIG. 1, the system 100 provides communication for multiple cells 102 such as, for example, macro cells 102a-102g, with each cell being serviced by a corresponding access point (AP) or points 104, such as, for example, APs 104a-104g. Each macro cell may be further divided into one or more sectors (not shown). As further shown in FIG. 1, various access terminal (AT) devices 106, including ATs 106a-106l, also known interchangeably as user equipment (UE) or as mobile stations (MS), or as terminal devices, may be dispersed at various locations throughout the system. Each AT 106 may communicate with one or more APs 104 on a downlink (DL) and/or an uplink (UL) at a given moment, depending upon whether the AT 106 is active and whether it is in soft handoff, for example. The wireless communication system 100 may provide service over a large geographic region. For example, the macro cells 102a-102g may cover only a few blocks within a neighborhood or several square miles in a rural environment.

Figure 2:
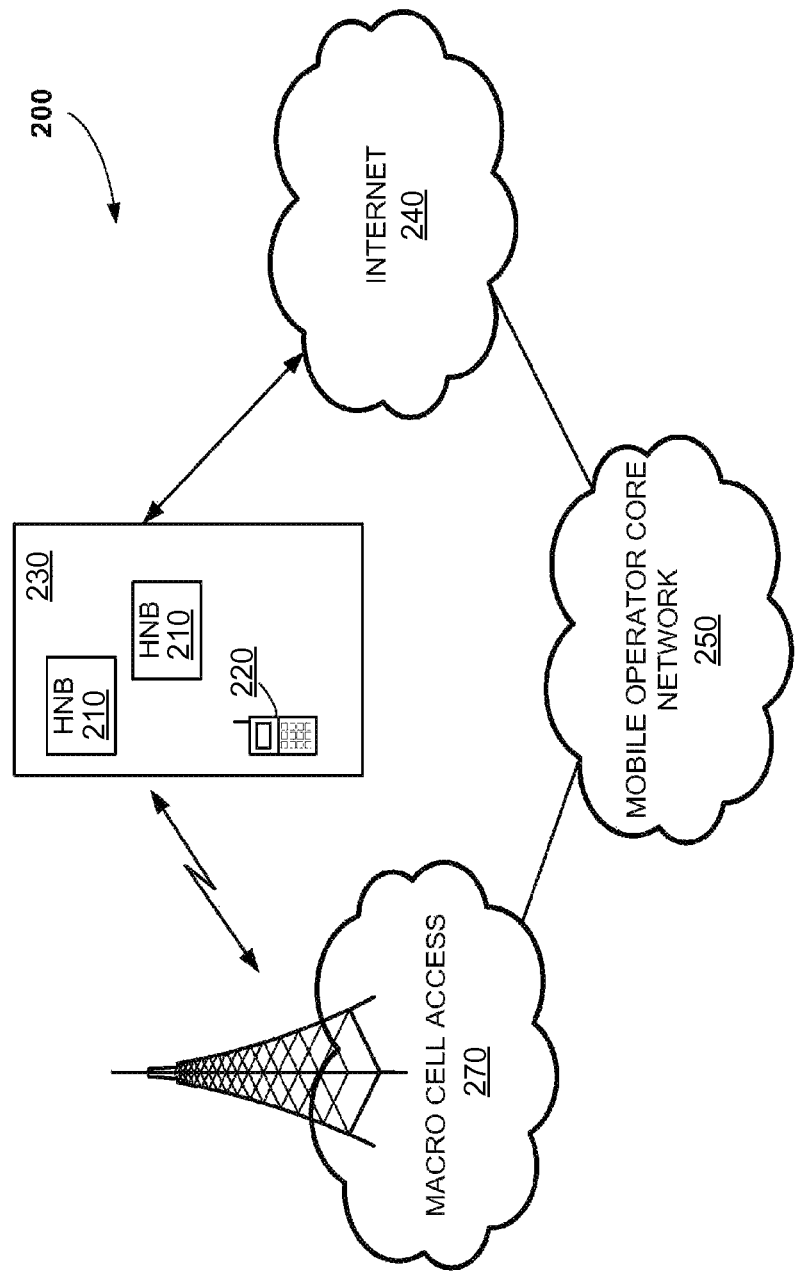
FIG. 2 is a communication system to enable deployment of access point base stations within a network environment according to various embodiments of the disclosure.

FIG. 2 illustrates an exemplary communication system to enable deployment of femto nodes (or other small cell nodes), also known as femto cells (access point base stations), within a network environment. As shown in FIG. 2, the system 200 includes multiple femto nodes, or, in the alternative, femto cells, access point base stations, Home Node B (HNB) units such as, for example, HNB 210. Each of the HNB units 210 may be installed in a corresponding relatively small coverage network environment, such as, for example, in one or more sites 230. Each of the HNB units 210 may be configured to serve associated user equipment (UE) 220. Each HNB 210 may be coupled to and further configured to communicate via a wide area network (WAN), such as the Internet 240, and to any node on the Internet, including a macro mobile operator core network 250 (also referred to as a "core network" or "macro-cellular network"). In exemplary configurations, a site might include DSL routers and/or cable modems (not shown). There may be at least two communication paths between the UE 220 and the core network 250, for instance, a path including macro cell access 270 and a path including the Internet 240.

Although embodiments described herein use 3GPP terminology, it is to be understood that the embodiments may be applied not only to 3GPP (Rel99, Rel5, Rel6, Rel7, etc.) technology, but also to 3GPP2 (1xRTT, 1xEV-DO Rel0, RevA, RevB, etc.) technology, as well as to other known and related technologies. In such embodiments described herein, the proprietor of the HNB 210 might subscribe to mobile services such as, for example, 3G or LTE mobile services, offered through the core network 250, and the UE 220 might be capable of operating both in a macro cellular environment and in an HNB-based small coverage network environment. Thus, the HNB 210 might be adapted for backward compatibility with any existing UE 220.

When on the macro-cellular network 250, the UE 220 may be operating on a frequency different than the one used by the HNB 210. In the course of searching procedures, where the UE 220 evaluates a neighbor list from the macro cells, it will not find the HNB 210. HNBs, such as femto cells, may use one of several available carrier frequencies. If the UE 220 is not operating on that very frequency, the UE 220 would miss the HNB 210, and continue to operate on the macro-cellular network 250, although the UE 220 is within coverage of the HNB 210. Additionally, even if there is a way to find a HNB 210, the UE 220 may not be authorized to access the HNB 210 (access may be restricted). The problem can be further complicated by the fact that new HNBs are continually being put into operation.

Figure 3A:
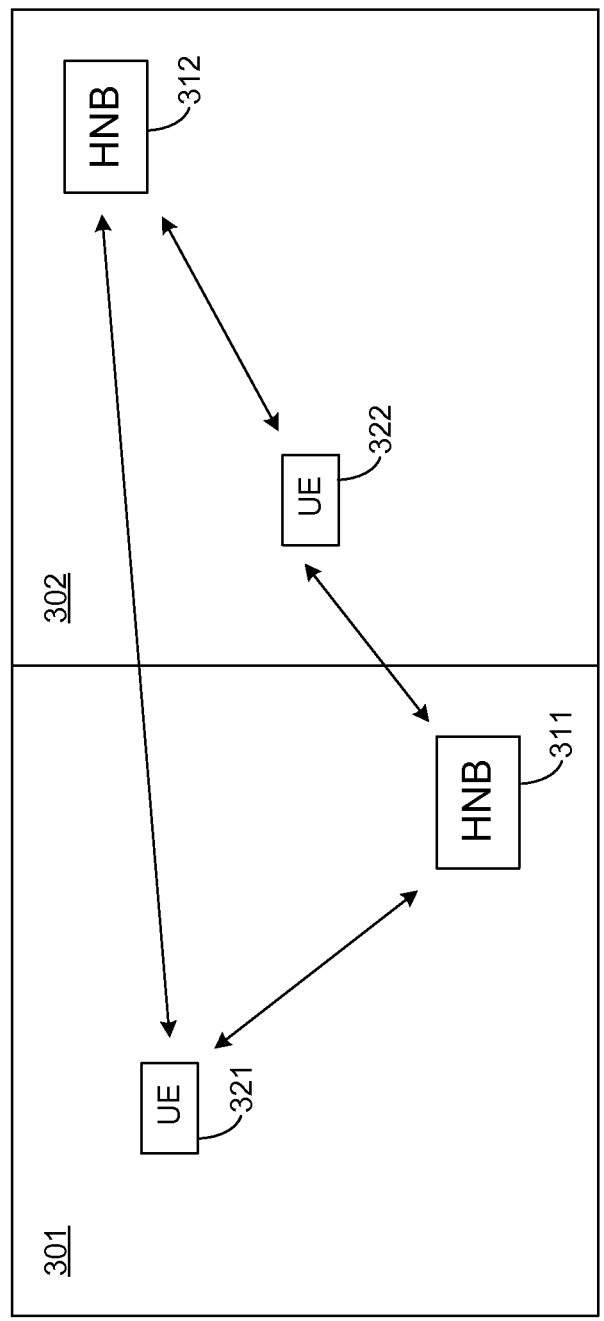
FIGS. 3A and 3B are block diagrams of network environments according to various embodiments of the disclosure.
Figure 3B:
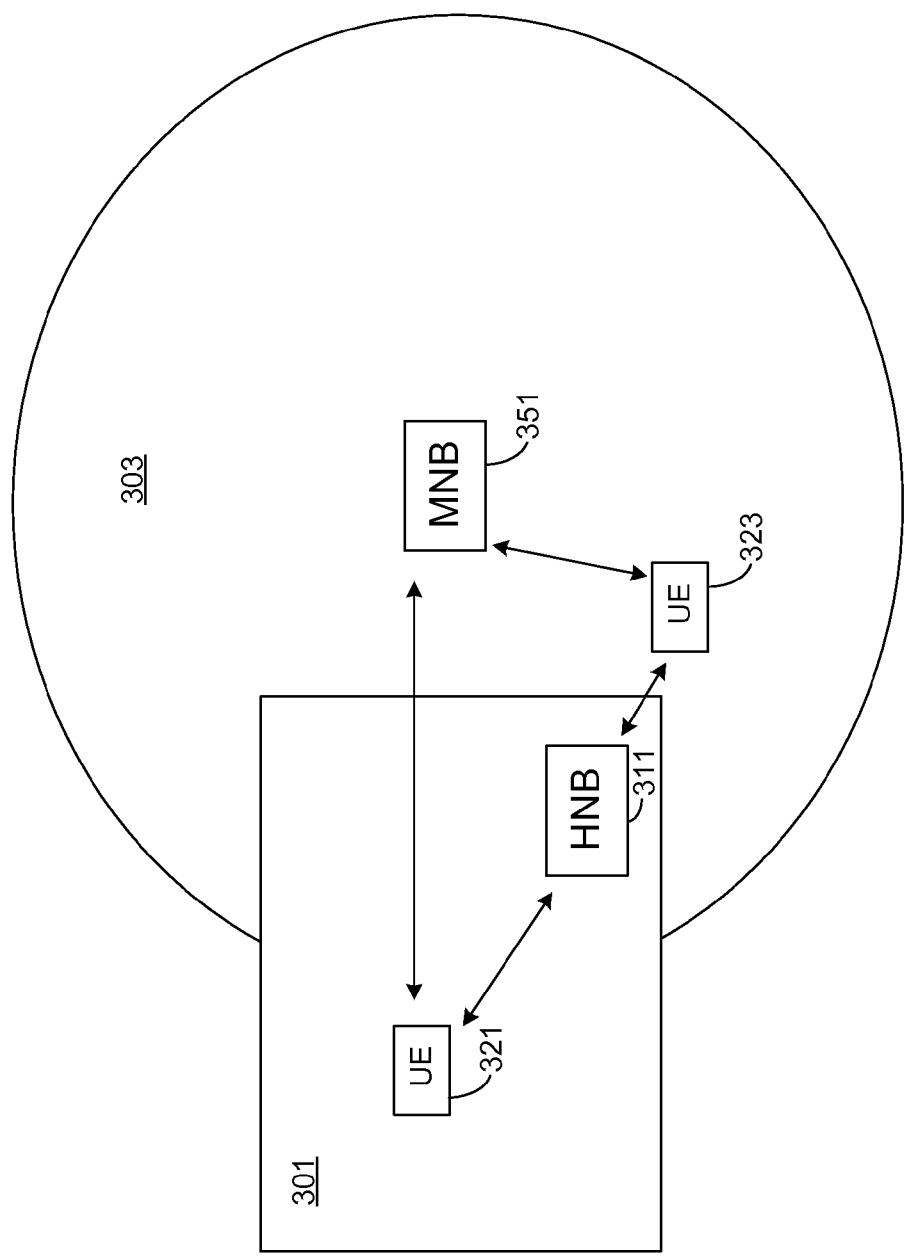

With reference to FIGS. 2-3B, various embodiments relate to a system and a method for cancelling uplink interference, which is caused by inter-cell UEs. In some instances, uplink interference is caused by inter-cell UEs that are associated with other small cell devices or the like. For example, a first location 301 (e.g., apartment, home, office, etc.) may contain a first base station or small cell 311 (which may be similar to the HNB 210), such as a femto cell or the like. A first UE 321 (which may be similar to the UE 220) may be associated with the first base station 311. A second location 302 (e.g., apartment, home, office, etc.) adjacent or otherwise near the first location 301 may contain a second base station or small cell 312 (which may be similar to the HNB 210). A second UE 322 (which may be similar to the UE 220) may be associated with the second base station 312. If close enough to the first base station 311, the second UE 322 may cause uplink interference at the first base station 311.

In some instances, uplink interference is caused by inter-cell UEs that are associated with a macro cell or the like. For example, a third location 303 may include a macro base station 351 (which may be similar to the core network 250). The macro base station 351 may be associated with a macro UE 323 (which may be similar to the UE 220). If close enough to the first base station 311, the macro UE 323 may cause uplink interference at the first base station 311.

In various embodiments, the first base station 311 may configured to cancel the uplink interference caused by inter-cell UEs using assistance information from one or more neighboring base stations (e.g., 312, 351). Accordingly, the assistance information, which includes various parameters for transmissions of a UE (e.g., 322, 323) associated with the one or more neighboring base stations 312, 351, is transmitted to the first base station 311, thereby allowing the first base station 311 to apply interference cancellation techniques to a received waveform.

Figure 10:
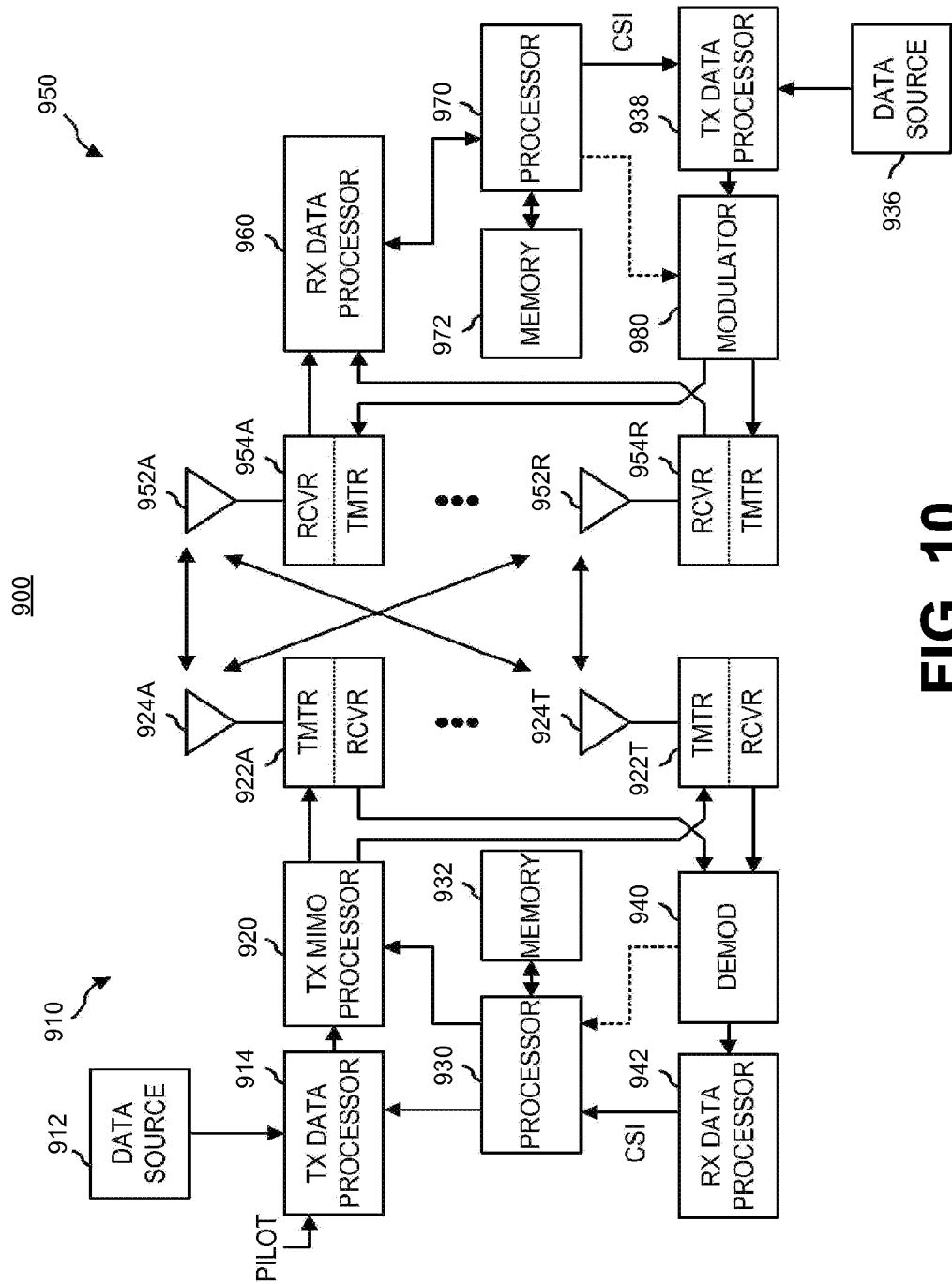
FIG. 10 illustrates a simplified block diagram of several sample aspects of communication components according to various embodiments of the disclosure.

In some embodiments, the assistance information may be reported to the first base station 311 in response to the first base station 311 detecting uplink interference caused by one or more inter-cell UEs. For instance, with reference to FIGS. 3A-4A, according to a process B400, at block B410, the first base station 311 may detect uplink interference (e.g., via transceiver 954A in FIG. 10) to an uplink channel of the first base station 311 from one or more of the inter-cell UEs 322, 323 communicating to the neighboring base stations 312, 351. At block B420, in response to detecting the uplink interference, the first base station 311 may request the assistance information from the neighboring base station(s) 312, 351 to which the one or more inter-cell UEs 322, 323 are associated. At block B430, the first base station 311 receives (e.g., via transceiver 954A in FIG. 10) the assistance information, for example, from the neighboring base station(s) 312, 351. Accordingly at block B440, the first base station 311 (e.g., processor 930 in FIG. 10) may perform interference cancellation, for instance, as described in the disclosure, using the assistance information received from the neighboring base station(s) 312, 351 to cancel at least a portion (e.g., transmission(s) by the inter-cell UE(s)) of a received signal.

Figure 4A:
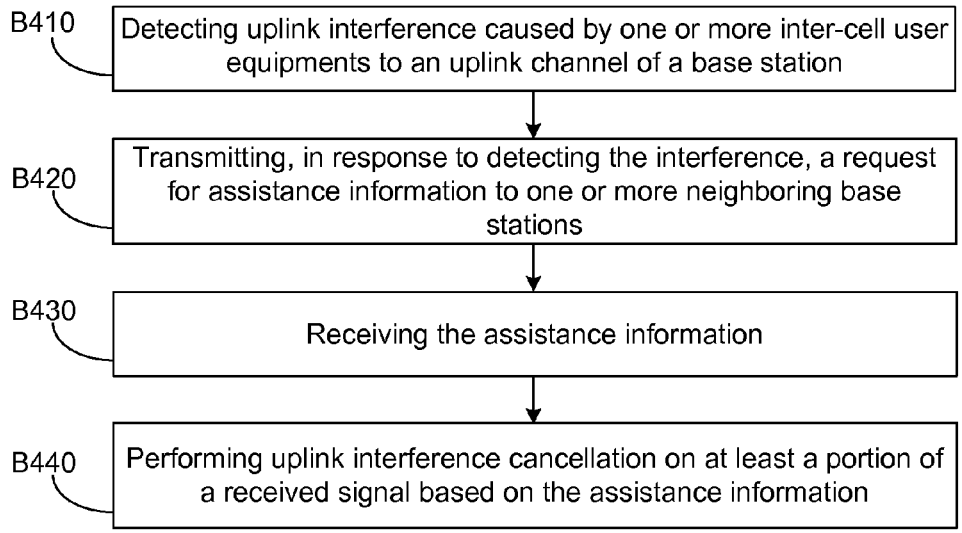
FIGS. 4A and 4B are methods of managing uplink interference according to various embodiments of the disclosure.
Figure 4B:
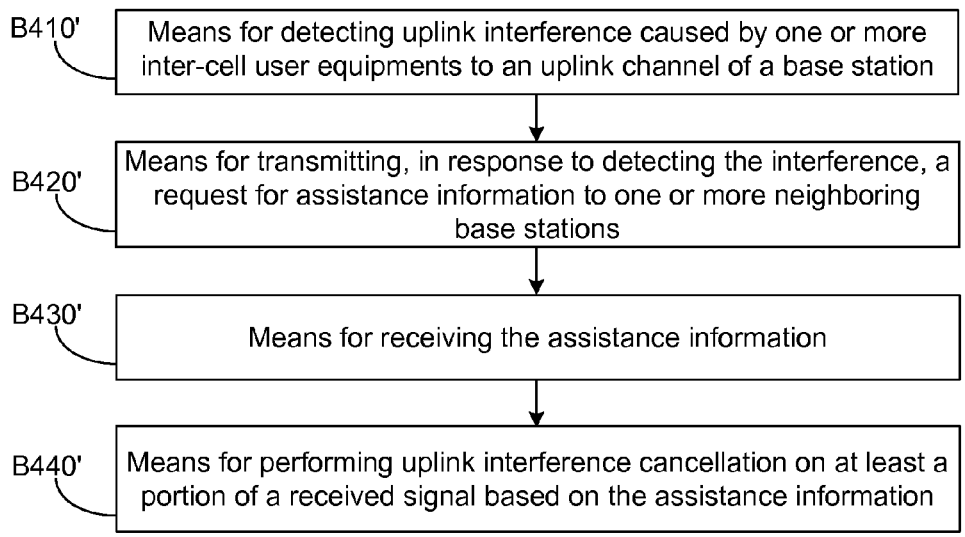

The method B400 described in FIG. 4A above may be performed by various hardware and/or software component(s) and/or module(s) corresponding to the means-plus-function blocks B400' illustrated in FIG. 4B. In other words, blocks B410 through B440 illustrated in FIG. 4A correspond to means-plus-function blocks B410' through B440' illustrated in FIG. 4B.

Figure 5:
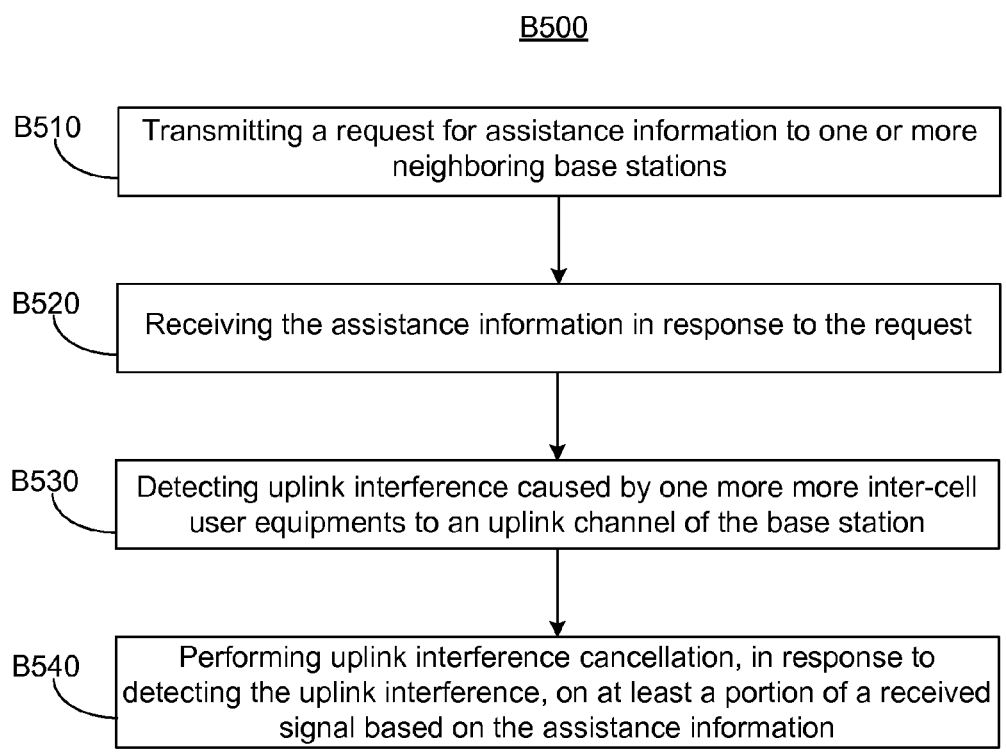
FIG. 5 is a method of managing uplink interference according to various embodiments of the disclosure.

In some embodiments, the first base station 311 is configured to request the assistance information from the neighboring base station(s) 312, 351 for any ongoing transmission with the associated UE(s) 322, 323 that could cause uplink interference to the first base station 311. For instance, with reference to FIGS. 3A, 3B, and 5, according to a process B500, at block B510, the first base station 311 may request assistance information from the neighboring base station(s)

312, 351, for instance, before the first base station 311 detects any uplink interference. At block B520, the assistance information may be received from the neighboring base station(s) 312, 351 as transmissions by the associated UE(s) 322, 323 occur. Accordingly, if the first base station 311 detects uplink interference (block B530), the first base station 311 can perform interference cancellation using the already-provided assistance information (received at block B520) at block B540.

Figure 6:
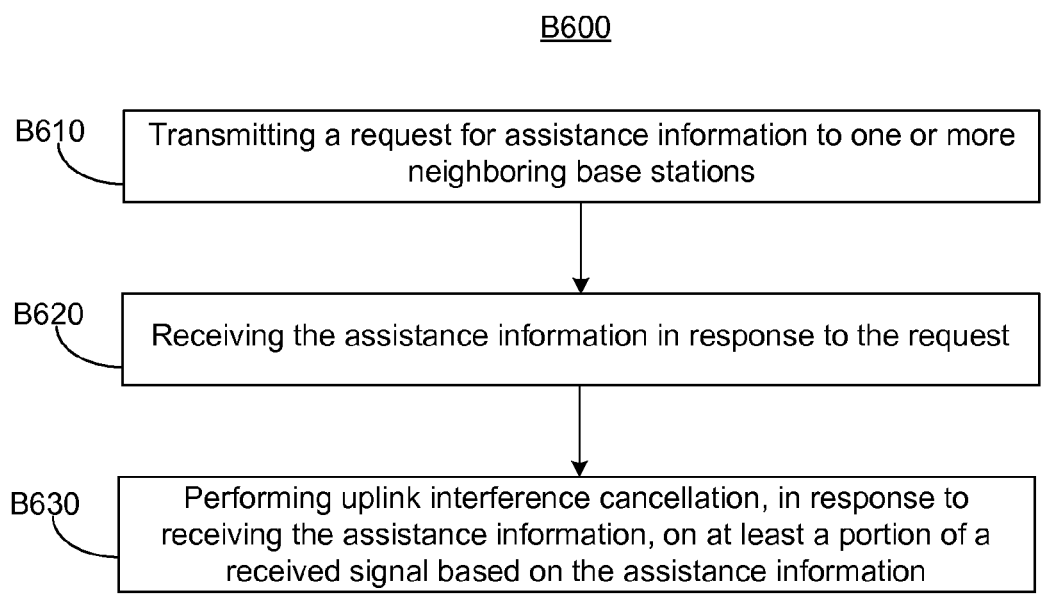
FIG. 6 is a method of managing uplink interference according to various embodiments of the disclosure.

Alternatively, the first base station 311 may perform the interference cancellation in response to receiving the assistance information without detecting the uplink interference. For instance, with reference to FIGS. 3A, 3B, and 6, according to a process B600, at block B610, the first base station 311 may request assistance information from the neighboring base station(s) 312, 351, for instance, before the first base station 311 detects any uplink interference. At block B620, the assistance information may be received from the neighboring base station(s) 312, 351 as transmissions by the associated UE(s) 322, 323 occur. At block B630, in response to receiving the assistance information, the first base station 311 may perform interference cancellation using the received assistance information.

Figure 7:
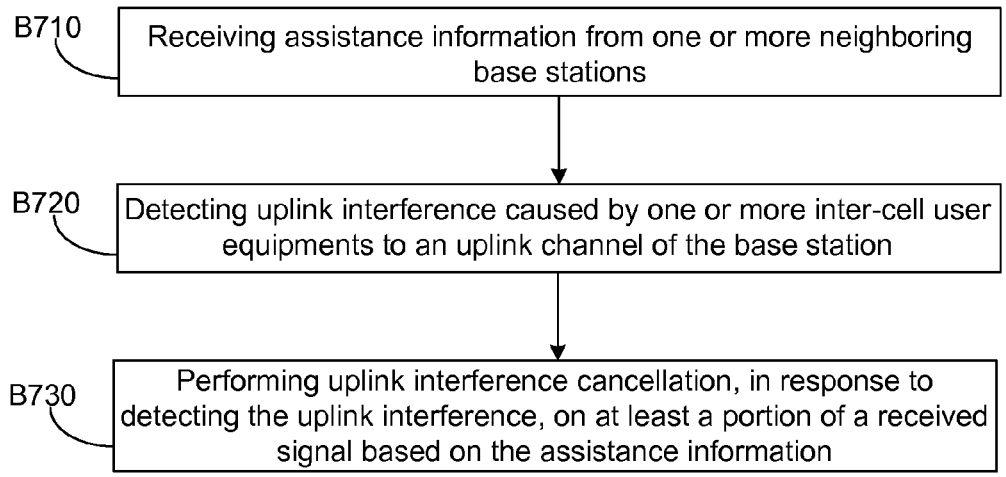
FIG. 7 is a method of managing uplink interference according to various embodiments of the disclosure.

In some embodiments, the neighboring base station(s) 312, 351 may provide the assistance information to its neighboring base station(s), including the first base station 311, about ongoing transmission with one or more of its UEs (e.g., 322, 323) that could cause uplink interference to the first base station 311, for instance without (or otherwise not in response to) a request from the first base station 311. For instance, with reference to FIGS. 3A, 3B, and 7, according to a process B700, at block B710, the assistance information may be received at the first base station 311 proactively, for example, if the neighboring base station 312 is aware of the uplink interference caused by the UE 322, which is associated with the neighboring base station 312, to the first base station 311. Accordingly, if the first base station 311 detects uplink interference (block B720), the first base station 311 can perform interference cancellation using the already-provided assistance information (received at block B710) at block B730.

For example, with reference to FIGS. 3A, 3B, 7, 9A, and 9B, at block B910, the UE 322 may detect the primary scrambling code (PSC) or other identifier for the first base station 311. At block B920, the UE 322 may identify the first base station 311 to the neighboring base station 321 to which the UE 322 is associated. Accordingly, the base station 311, which is receiving uplink interference by the UE 322, is identified to the neighboring base station 321. At block B930, the neighboring base station 321 provides the assistance information to the base station 311 to allow the first base station to perform interference cancellation using the received assistance information.

Figure 8:
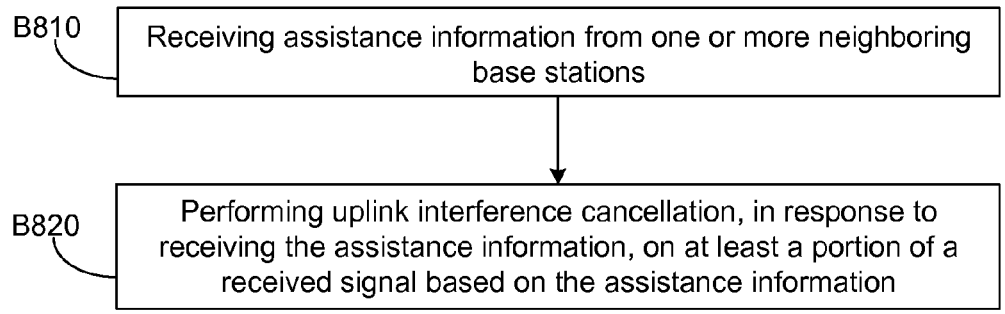
FIG. 8 is a method of managing uplink interference according to various embodiments of the disclosure.
Figure 9A:
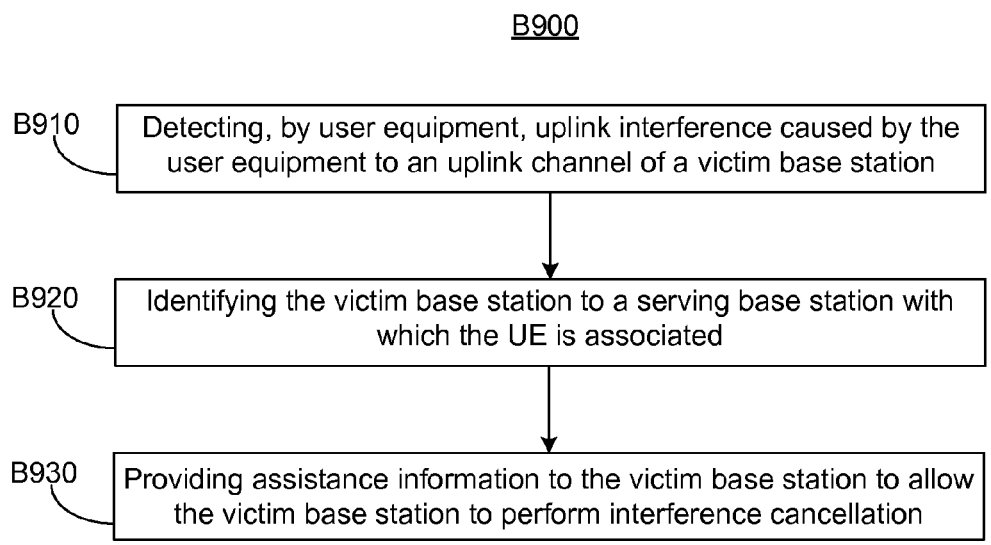
FIG. 9A is a method of managing uplink interference according to various embodiments of the disclosure.
Figure 9B:
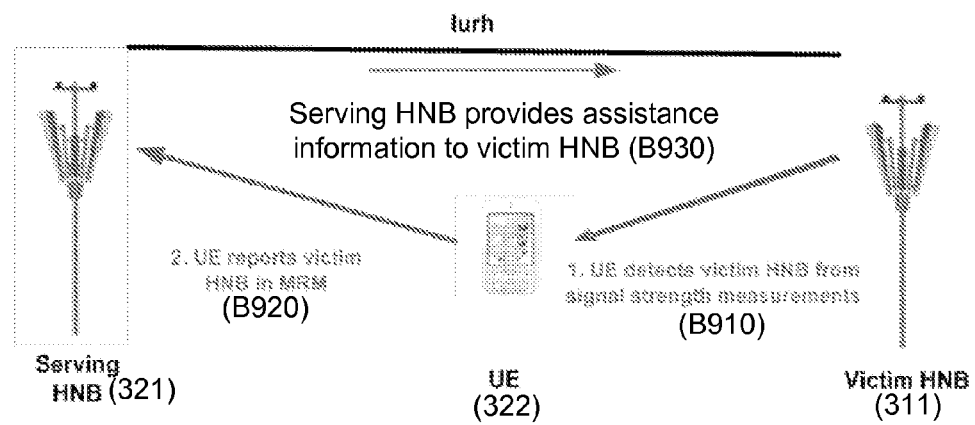
FIG. 9B is a block diagram corresponding to a method of managing uplink interference according to various embodiments of the disclosure.

Alternatively, the first base station 311 may perform the interference cancellation in response to receiving the assistance information without detecting the uplink interference. For instance, with reference to FIGS. 3A, 3B, and 8, according to a process B800, at block B810, assistance information may be received from the neighboring base station(s) 312, 351 as transmissions by the associated UE(s) 322, 323 occur. At block B820, in response to receiving the assistance information, the first base station 311 may perform interference cancellation using the received assistance information.

With reference to FIGS. 1-9, in various embodiments, the neighboring base station(s) 312, 351 provide the assistance information to the first base station 311. In other embodiments, an inter-cell UE (e.g., 322, 323) communicating with the neighboring base station 312, 351 can provide the first base station 311 the assistance information needed for inter-cell interference cancellation. The assistance information may be provided, for example (but not limited to), via out-of-band (OOB) link (e.g., Bluetooth, WiFi, etc.), or the like.

In various embodiments, the uplink interference may be detected by the first base station. In other embodiments, the uplink interference may be detected by any component, such as the neighboring base station(s) 312,351, the inter-cell UE(s) 322, 323, the UE 321 associated with the first base station 311, or the like.

In various embodiments, the assistance information may be a parameter list relating to the transmission of the inter-cell UE(s) 322, 323, which are associated with the respective neighboring base stations 312, 351. The parameter list may include, for example (but not limited to), one or more of scrambling code type, scrambling code number, spreading factor, orthogonal variable spreading factor (OVSF) code used, transmission time interval (TTI), channel coding type, rate matching attribute, cyclic redundancy check (CRC), uplink dedicated packet control channel (UL DPCCH) slot format, number of feedback indicator (FBI) bits, number of transmit power control (TPC) bits, number of transport format combination indicator bits (TFCI) bits, transport format combination set (TFCS), transport format set (TFS) for uplink, puncturing limit, gainfactor_BetaC, gainfactor_BetaD, gainfactor_BetaHS, DPCH frame offset and chip offset, and/or the like.

The first base station 311 performs interference cancellation (e.g., blocks B440, B540, B630, B730, B820). Interference cancellation may generally include demodulating data of a signal from a given UE, decoding the demodulated data, and then re-encoding the decoded data (e.g., to recover chip sequence). Then, the decoded data can be used for channel estimation. Once the desired UE is decoded, its signal can be treated as known uplink interference to other UEs. Accordingly, waveform synthesis (or interference filtering) may be performed to reconstruct via filtering the received waveform samples of the decoded UE. The reconstructed samples are subtracted from the received sample to cancel the uplink interference. For instance, the first base station 311 may perform interference cancellation to a waveform sample (signal) received at the first base station 311 by decoding a signal from the (interfering) inter-cell UE(s) 322, 323 using the assistance information and subtracting the signal of the inter-cell UE(s) 322, 323 from the received waveform at the first base station 311 to produce a cleaner signal for the UE 321 associated with the first base station 311.

Interference cancellation (IC) may be performed in any suitable manner, such as successive IC, iterative parallel IC, or iterative group IC. The inter-cell IC helps in increasing the user experience of the UE 321 served by the first base station 311 by increasing the data rate served to the UE 321 at the edge of first base station 311 and/or the coverage of the first base station 311 for the same data rate. Throughout various embodiments, IC is not attempted by the first base station 311 until the first base station 311 receives the assistance information.

For successive IC, UEs are ordered by their chance of successful decoding such that a packet of a strongest UE (e.g., closest to first base station 311) is decoded first. After the packet is decoded, the signal is reconstructed and subtracted from the received signal. The remaining UE(s) are ordered again for a subsequent round of decoding. This procedure is performed iteratively over all UEs. In general, a UE decoded later benefits from cancellation of previous UE(s) and encounters improved signal to interference and noise ratio (SINR).

For iterative parallel IC, multiple UEs (the UE 321 and the inter-cell UEs 322, 323) are decoded and cancelled from the received signal simultaneously. If a UE fails decoding in the first iteration, the UE will be decoded again in the subsequent iteration; otherwise, no subsequent iteration is done. Processing power may be distributed among multiple parallel demodulators and decoders, for example.

For iterative group IC, UEs are divided into two groups: UEs 321 of the first base station 311 and inter-cell UEs 322, 323 of the neighboring base stations 312, 351. Parallel IC may be performed on the second group, and then parallel IC may be performed on the first group.

In some embodiments, even if an inter-cell UE 322, 323 fails to decode, the first base station 311 could attempt to cancel a portion of the inter-cell UE's waveform (signal), for example, by performing soft interference cancellation. For instance, minimum mean square error (MMSE) estimates of data symbols of the waveform of the inter-cell UE can be derived from a soft output of a channel decoder of the first base station 311 to reconstruct the waveform. In particular embodiments, soft IC may be implemented if assistance information is not available (e.g., from interfering macro UE 323).

In some embodiments, if uplink interference is detected, a power control set point for the UE 312 for the first base station 311 can be modified accordingly. In some embodiments, if the first base station has available capacity (e.g., air-link or backhaul resources), the first base station 311 is configured to switch from closed access (first mode) to "hybrid" access (second mode). In hybrid access, any user equipment can access the first base station 311, but priority is given to authorized UEs (i.e., the UEs associated with the first base station 311).

In some embodiments, a bit stream (e.g., from inter-cell UEs) decoded by the first base station 311 can be forwarded to the neighboring base station 321. Accordingly, if a waveform intended for the neighboring base station 321 (e.g., from the UE 322) has an error, the forwarded bit stream may be used by the neighboring base station 321 for processing thereof to mitigate retransmissions.

In various embodiments, the base stations (e.g., 311, 312, 351) may be configured to communicate and/or identify each other in any suitable manner. For example, a base station gateway, such as a home Node B gateway (HNB-GW), or other entity may maintain identifying information for the base stations. The identifying information may include, but is not limited to, a unique identifier (e.g., FemtoID), out-of-band (OOB) ID, primary scrambling code (PSC), IP address, and/or the like. For instance, a base station may detect neighboring base stations via a network listening module (NLM) or through OOB. As another example, the base station may look up on a server (e.g., RADIUS server) for the IP address of the neighboring base stations based on known information, such as PSC, unique identifier, OOB ID, etc. As yet another example, neighboring base stations may setup an IP link and communicate via the broadband connection. Other examples include (but are not limited to) Long Term Evolution device to device (LTE-D2D), LTE White Space (LTE-WS), OOB links, such as WiFi, WiFi Direct, power line communication (PLC), and/or the like According to various embodiments, performing inter-cell uplink interference cancellation provides advantages in that no changes to the air interface are required and no changes to the UE are required The teachings herein may be incorporated into a node (e.g., a device) employing various components for communicating with at least one other node. FIG. 9 illustrates several sample components that may be employed to facilitate communication between nodes. Specifically, FIG. 9 illustrates a wireless device 910 (e.g., an access point, HNB, small cell, etc.) and a wireless device 950 (e.g., an access terminal or UE) of a system 900.

With reference to FIGS. 1-10, in particular embodiments, the wireless device 910 may be the first base station 311 (and/or one or more of the neighboring base stations 321, 351). The wireless device 950 may be the UE 321 (and/or one or more of the inter-cell UEs 322, 323). The wireless device 910 and/or the wireless device 950 may implement any of the features of the embodiments relating to FIGS. 1-8.

At the device 910, traffic data for a number of data streams is provided from a data source 912 to a transmit ("TX") data processor 914. In some aspects, each data stream is transmitted over a respective transmit antenna. The TX data processor 914 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 930. A data memory 932 may store program code, data, and other information used by the processor 930 or other components of the device 910.

The modulation symbols for all data streams are then provided to a TX MIMO processor 920, which may further process the modulation symbols (e.g., for OFDM). The TX MIMO processor 920 then provides $N_T$ modulation symbol streams to $N_T$ transceivers ("XCVR") 922A through 922T. In some aspects, the TX MIMO processor 920 applies beam-forming weights to the symbols of the data streams and to the antenna from which the symbol is being transmitted Each transceiver 922 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 922A through 922T are then transmitted from $N_T$ antennas 924A through 924T, respectively.

At the device 950, the transmitted modulated signals are received by $N_R$ antennas 952A through 952R and the received signal from each antenna 952 is provided to a respective transceiver ("XCVR") 954A through 954R. Each transceiver 954 conditions (e.g., filters, amplifies, and downconverts) a respective received signal, digitizes the conditioned signal to provide samples, and further processes the samples to provide a corresponding "received" symbol stream.

A receive ("RX") data processor 960 then receives and processes the $N_R$ received symbol streams from the $N_R$ transceivers 954 based on a particular receiver processing technique to provide $N_T$ "detected" symbol streams. The RX data processor 960 then demodulates, deinterleaves, and decodes each detected symbol stream to recover the traffic data for the data stream. The processing by the RX data processor 960 is complementary to that performed by the TX MIMO processor 920 and the TX data processor 914 at the device 910.

A processor 970 periodically determines which precoding matrix to use (discussed below). The processor 970 formulates a reverse link message comprising a matrix index portion and a rank value portion. A data memory 972 may store program code, data, and other information used by the processor 970 or other components of the device 950.

The reverse link message may comprise various types of information regarding the communication link and/or the received data stream. The reverse link message is then processed by a TX data processor 938, which also receives traffic data for a number of data streams from a data source 936, modulated by a modulator 980, conditioned by the transceivers 954A through 954R, and transmitted back to the device 910.

At the device 910, the modulated signals from the device 950 are received by the antennas 924, conditioned by the transceivers 922, demodulated by a demodulator ("DE-MOD") 940, and processed by a RX data processor 942 to extract the reverse link message transmitted by the device 950. The processor 930 then determines which precoding matrix to use for determining the beam-forming weights then processes the extracted message.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to anyone or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95, and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an UltraMobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Rel99, Rel5, Rel6, Rel7) technology, as well as 3GPP2 (1×RTT, 1×EV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations, an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), or some other similar terminology.

In some embodiments, a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of managing uplink interference at a base station, the method comprising:
   transmitting, from the base station, a request for assistance information relating to interfering uplink transmissions from one or more inter-cell user equipments to a neighboring base station;
   receiving, at the base station, a wireless transmission comprising the assistance information from the neighboring base station in response to the request, the assistance information comprising a parameter list of ongoing transmissions by the one or more inter-cell user equipments associated with the neighboring base station, the ongoing transmissions of the one or more inter-cell user equipments causing uplink interference to an uplink channel of the base station; and
   performing uplink interference cancellation, at the base station, on at least a portion of a received signal based on the assistance information to generate a resulting signal in response to receiving the assistance information.

2. The method of claim 1, wherein the at least a portion of the received signal is cancelled via iterative parallel interference cancellation.

3. The method of claim 1, wherein the at least a portion of the received signal is cancelled via iterative group interference cancellation.

4. The method of claim 1, wherein the assistance information is received in response to one of the inter-cell user equipments determining that said inter-cell equipment is causing uplink interference to the uplink channel of the base station.

5. The method of claim 1, wherein the assistance information is received directly from the neighboring base station.

6. The method of claim 5, wherein the assistance information is received directly from the neighboring base station via at least one of Wi-Fi or Wi-Fi Direct.

7. The method of claim 5, wherein the assistance information is received directly from the neighboring base station via Long-Term Evolution White Space (LTE-WS).

8. The method of claim 5, wherein the assistance information is received directly from the neighboring base station via Long-Term Evolution device to device (LTE-D2D).

9. The method of claim 5, wherein the assistance information is received directly from the neighboring base station via a power line connection (PLC).

10. The method of claim 5, wherein the assistance information is received directly from the neighboring base station via a backhaul connection.

11. The method of claim 1, wherein the assistance information is received from the neighboring base station via a user equipment associated with the neighboring base station.

12. The method of claim 11, wherein the assistance information is received from the neighboring base station via the user equipment associated with the neighboring base station via a wireless wide area network (WWAN) interface.

13. The method of claim 11, wherein the assistance information is received from the neighboring base station via the user equipment associated with the neighboring base station via an out-of-band (OOB) link.

14. The method of claim 1, wherein the base station comprises at least one of a small cell device or a macro cell device.

15. The method of claim 14, wherein the small cell device comprises a femtocell.

16. The method of claim 1, wherein the parameter list of the assistance information includes one or more of scrambling code type and scrambling code number.

17. The method of claim 1, wherein the parameter list of the assistance information includes one or more of spreading factor and orthogonal variable spreading factor (OVSF) code.

18. The method of claim 1, wherein the parameter list of the assistance information includes transmission time interval (TTI).

19. The method of claim 1, wherein the parameter list of the assistance information includes channel-coding type.

20. The method of claim 1, wherein the parameter list of the assistance information includes a rate matching attribute.

21. The method of claim 1, wherein the parameter list of the assistance information includes cyclic redundancy check (CRC).

22. The method of claim 1, wherein the parameter list of the assistance information includes an uplink dedicated packet control channel (UL DPCCH) slot format including one or more of a number of feedback indicator (FBI) bits, a number of transmit power control (TPC) bits, or a number of transport format combination indicator bits (TFCI) bits.

23. The method of claim 1, wherein the parameter list of the assistance information includes one or more of transport format combination set (TFCS) and transport format set (TFS) for uplink.

24. The method of claim 1, wherein the parameter list of the assistance information includes puncturing limit.

25. The method of claim 1, wherein the parameter list of the assistance information includes one or more gain factors.

26. The method of claim 1, wherein the parameter list of the assistance information includes one or more of dedicated packet channel (DPCH) frame offset and chip offset parameters.

27. The method of claim 1, wherein the performing uplink interference cancellation comprises:
    decoding, from the received signal, a bit stream from the user equipment associated with the neighboring base station; and
    providing the decoded bit stream to the neighboring base station.

28. The method of claim 1, the method further comprising:
    determining a current resource utilization for the base station; and
    allowing access to an unauthorized user equipment when the current resource capacity is below a predetermined threshold.

29. The method of claim 28, wherein decoding priority is given to an authorized user equipment over the unauthorized user equipment.

30. The method of claim 1, wherein the uplink interference cancellation is performed without detecting the uplink interference by the base station.

31. The method of claim 1, further comprising receiving, at the base station, assistance information from at least one of the one or more inter-cell user equipments.

32. The method of claim 1, wherein the performing the uplink interference cancellation comprises:
    decoding packets associated with each of the one or more inter-cell user equipments during a first iteration, subtracting all the decoded packets that were successfully decoded during the first iteration from the received signal in parallel, decoding remaining packets that failed the decoding during the first iteration in a second iteration, and subtracting the remaining packets that were successfully decoded during the second iteration to generate the resulting signal, or
    determining a first group of the one or more inter-cell user equipments and a second group of the inter-cell user equipments, decoding packets associated with the first group of the one or more inter-cell user equipments, subtracting all the decoded packets from the first group in parallel, decoding packets associated with the second group of the one or more inter-cell user equipments, and subtracting all the decoded packets from the received signal in parallel to generate the resulting signal.

33. A base station for managing uplink interference, the base station comprising:
    a transceiver, at a base station, configured to transmit a request for assistance information relating to interfering uplink transmissions from one or more inter-cell user equipments to a neighboring base station and to receive a wireless transmission comprising the assistance information from the neighboring base station in response to the request, the assistance information comprising a parameter list of ongoing transmissions by the one or more user equipments associated with the neighboring base station, the ongoing transmissions of the one or more user equipments causing uplink interference to an uplink channel of the base station; and
a processor configured to perform uplink interference cancellation on at least a portion of a received signal based on the assistance information to generate a resulting signal in response to receiving the assistance information.

34. The base station of claim 33, wherein the processor is configured to perform the uplink interference cancellation by:
    decoding packets associated with each of the one or more inter-cell user equipments during a first iteration, subtracting all the decoded packet from the received signal in parallel, decoding remaining packets that failed the decoding during the first iteration in a second iteration, and subtracting the remaining packets that were successfully decoded during the second iteration to generate the resulting signal, or
    determining a first group of the one or more inter-cell user equipments and a second group of the inter-cell user equipments, decoding packets associated with the first group of the one or more inter-cell user equipments, subtracting all the decoded packets from the first group in parallel, decoding packets associated with the second group of the one or more inter-cell user equipments, and subtracting all the decoded packets from the received signal in parallel to generate the resulting signal.

35. An apparatus for managing uplink interference at a base station, the apparatus comprising:
    a memory; and
    at least one processor coupled to the memory and configured to:
        transmit, from the base station, a request for assistance information relating to interfering uplink transmissions from one or more inter-cell user equipments to a neighboring base station;
        receive, at the base station, a wireless transmission comprising the assistance information from the neighboring base station in response to the request, the assistance information comprising a parameter list of ongoing transmissions by the one or more inter-cell user equipments associated with the neighboring base station, the ongoing transmissions of the one or more inter-cell user equipments causing uplink interference to an uplink channel of the base station; and
        perform uplink interference cancellation, at the base station, on at least a portion of a received signal based on the assistance information to generate a resulting signal in response to receiving the assistance information.

36. The base station of claim 35, wherein the processor is configured to perform the uplink interference cancellation by:
    decoding packets associated with each of the one or more inter-cell user equipments during a first iteration, subtracting all the decoded packet from the received signal in parallel, decoding remaining packets that failed the decoding during the first iteration in a second iteration, and subtracting the remaining packets that were successfully decoded during the second iteration to generate the resulting signal, or
    determining a first group of the one or more inter-cell user equipments and a second group of the inter-cell user equipments, decoding packets associated with the first group of the one or more inter-cell user equipments, subtracting all the decoded packets from the first group in parallel, decoding packets associated with the second group of the one or more inter-cell user equipments, and subtracting all the decoded packets from the received signal in parallel to generate the resulting signal.

37. A non-transitory computer-readable medium storing computer executable code, comprising code to:
    transmit a request, from a base station, a request for assistance information relating to interfering uplink transmissions from one or more inter-cell user equipments to a neighboring base station;
    receive, at the base station, a wireless transmission comprising the assistance information from the neighboring base station in response to the request, the assistance information comprising a parameter list of ongoing transmissions by the one or more inter-cell user equipments associated with the neighboring base station, the ongoing transmissions of the one or more inter-cell user equipments causing uplink interference to an uplink channel of the base station; and
    perform uplink interference cancellation, at the base station, on at least a portion of a received signal based on the assistance information to generate a resulting signal in response to receiving the assistance information.

38. The non-transitory computer-readable medium of claim 37, wherein the code is configured to perform the uplink interference cancellation by:
    decoding packets associated with each of the one or more inter-cell user equipments during a first iteration, subtracting all the decoded packets that were successfully decoded during the first iteration from the received signal in parallel, decoding remaining packets that failed the decoding during the first iteration in a second iteration, and subtracting the remaining packets that were successfully decoded during the second iteration to generate the resulting signal, or
    determining a first group of the one or more inter-cell user equipments and a second group of the inter-cell user equipments, decoding packets associated with the first group of the one or more inter-cell user equipments, subtracting all the decoded packets from the first group in parallel, decoding packets associated with the second group of the one or more inter-cell user equipments, and subtracting all the decoded packets from the received signal in parallel to generate the resulting signal.

* * * * *